US008489132B2

(12) United States Patent
Karmarkar et al.

(10) Patent No.: US 8,489,132 B2
(45) Date of Patent: Jul. 16, 2013

(54) CONTEXT-ENRICHED MICROBLOG POSTING

(75) Inventors: Amit Karmarkar, Palo Alto, CA (US); Richard Peters, MissionViejo, CA (US)

(73) Assignee: Buckyball Mobile Inc., Palo Alto, CA (US)

( * ) Notice: Subject to any disclaimer, the term of this patent is extended or adjusted under 35 U.S.C. 154(b) by 298 days.

(21) Appl. No.: 12/770,626

(22) Filed: Apr. 29, 2010

(65) Prior Publication Data

US 2010/0211868 A1 Aug. 19, 2010

Related U.S. Application Data

(63) Continuation-in-part of application No. 12/422,313, filed on Apr. 13, 2009, which is a continuation-in-part of application No. 11/519,600, filed on Sep. 11, 2006, now Pat. No. 7,551,935, which is a continuation-in-part of application No. 11/231,575, filed on Sep. 21, 2005, now Pat. No. 7,580,719.

(60) Provisional application No. 61/161,763, filed on Mar. 19, 2009.

(51) Int. Cl.
*H04W 4/00* (2009.01)
*G06F 17/30* (2006.01)

(52) U.S. Cl.
USPC .............. 455/466; 707/999.01; 707/E17.002; 707/E17.116

(58) Field of Classification Search
USPC ......... 455/466; 707/999.01, E17.002, 17.116
See application file for complete search history.

(56) References Cited

U.S. PATENT DOCUMENTS

| 4,959,785 | A | 9/1990 | Yamamoto et al. |
| 5,493,692 | A | 2/1996 | Theimer et al. |
| 5,517,409 | A | 5/1996 | Ozawa et al. |
| 5,797,098 | A | 8/1998 | Schroeder et al. |
| 6,473,621 | B1 | 10/2002 | Heie |
| 6,560,456 | B1 | 5/2003 | Lohtia et al. |
| 6,731,940 | B1 | 5/2004 | Nagendran |
| 6,750,883 | B1 | 6/2004 | Parupudi et al. |
| 6,785,869 | B1 * | 8/2004 | Berstis .......................... 715/210 |
| 6,813,507 | B1 | 11/2004 | Gress et al. |
| 6,816,578 | B1 | 11/2004 | Kredo et al. |

(Continued)

FOREIGN PATENT DOCUMENTS
WO WO-2007104487 9/2007

OTHER PUBLICATIONS

U.S. Appl. No. 11/742,242, filed Apr. 30, 2007, Maloney, David.

(Continued)

*Primary Examiner* — Matthew Sams
*Assistant Examiner* — Diego Herrera

(57) ABSTRACT

Disclosed are a system, method, and article of manufacture for context-enriched microblog posting. In one aspect, a message component is provided. A context data related to a context of a computing device used to generate the message component is provided. The message component and the context data are associated. The context data may be communicated to a web browser. The message component may be communicated to the web browser. The message component may be rendered in a format for communication as a short message service (SMS) message that includes a reference to the context data. The message component and the context data may be rendered in a format for communication as a multimedia messaging service (MMS) message.

26 Claims, 12 Drawing Sheets

U.S. PATENT DOCUMENTS

| | | | |
|---|---|---|---|
| 6,847,892 B2* | 1/2005 | Zhou et al. ................... | 701/213 |
| 6,898,518 B2 | 5/2005 | Padmanabhan | |
| 6,963,839 B1 | 11/2005 | Ostermann et al. | |
| 6,964,020 B1 | 11/2005 | Lundy | |
| 6,966,035 B1 | 11/2005 | Suess et al. | |
| 6,990,180 B2 | 1/2006 | Vuori | |
| 6,993,553 B2 | 1/2006 | Kaneko et al. | |
| 7,072,956 B2 | 7/2006 | Parupudi et al. | |
| 7,177,902 B2 | 2/2007 | Hubbard | |
| 7,181,387 B2 | 2/2007 | Ju et al. | |
| 7,207,004 B1 | 4/2007 | Harrity | |
| 7,254,773 B2 | 8/2007 | Bates et al. | |
| 7,272,406 B2 | 9/2007 | Chava et al. | |
| 7,293,074 B1 | 11/2007 | Jellinek et al. | |
| 7,305,230 B2 | 12/2007 | Zhigang | |
| 7,315,902 B2 | 1/2008 | Kirkland | |
| 7,359,714 B2 | 4/2008 | Parupudi et al. | |
| 7,363,357 B2 | 4/2008 | Parupudi et al. | |
| 7,366,500 B1* | 4/2008 | Yalovsky et al. .......... | 455/414.1 |
| 7,424,682 B1 | 9/2008 | Pupius et al. | |
| 7,551,935 B2 | 6/2009 | Karmarkar | |
| 7,580,719 B2 | 8/2009 | Karmarkar | |
| 7,693,953 B2* | 4/2010 | Middleton et al. ............ | 709/207 |
| 2002/0077135 A1 | 6/2002 | Hyon | |
| 2002/0083167 A1* | 6/2002 | Costigan et al. .............. | 709/224 |
| 2002/0173294 A1 | 11/2002 | Nemeth et al. | |
| 2002/0187794 A1 | 12/2002 | Fostick et al. | |
| 2002/0193996 A1* | 12/2002 | Squibbs et al. ............... | 704/260 |
| 2002/0198715 A1 | 12/2002 | Belrose | |
| 2003/0023424 A1 | 1/2003 | Weiner | |
| 2003/0078033 A1 | 4/2003 | Sauer et al. | |
| 2003/0085989 A1 | 5/2003 | Tay | |
| 2003/0125927 A1* | 7/2003 | Seme ................................ | 704/3 |
| 2003/0144895 A1 | 7/2003 | Aksu et al. | |
| 2003/0186716 A1 | 10/2003 | Dorenbosch et al. | |
| 2003/0207701 A1 | 11/2003 | Rolnik et al. | |
| 2003/0236658 A1 | 12/2003 | Yam | |
| 2004/0024683 A1 | 2/2004 | Morciniec et al. | |
| 2004/0034561 A1 | 2/2004 | Smith | |
| 2004/0044517 A1 | 3/2004 | Palmquist | |
| 2004/0092272 A1 | 5/2004 | Valloppillil | |
| 2004/0102201 A1 | 5/2004 | Levin | |
| 2004/0102956 A1 | 5/2004 | Levin | |
| 2004/0110493 A1 | 6/2004 | Alvarez et al. | |
| 2004/0122979 A1 | 6/2004 | Kirkland | |
| 2004/0158471 A1 | 8/2004 | Davis et al. | |
| 2004/0162830 A1* | 8/2004 | Shirwadkar et al. ............ | 707/10 |
| 2004/0179545 A1 | 9/2004 | Erola et al. | |
| 2004/0194141 A1 | 9/2004 | Sanders | |
| 2004/0215526 A1 | 10/2004 | Luo et al. | |
| 2004/0221256 A1 | 11/2004 | Martin et al. | |
| 2004/0221260 A1 | 11/2004 | Martin et al. | |
| 2004/0235503 A1 | 11/2004 | Koponen et al. | |
| 2004/0248591 A1 | 12/2004 | Fish | |
| 2004/0253963 A1 | 12/2004 | Park et al. | |
| 2004/0266462 A1 | 12/2004 | Chava et al. | |
| 2005/0003837 A1 | 1/2005 | Midkiff et al. | |
| 2005/0004840 A1 | 1/2005 | Wanninger | |
| 2005/0027608 A1 | 2/2005 | Wiesmuller et al. | |
| 2005/0038892 A1 | 2/2005 | Huang et al. | |
| 2005/0066044 A1 | 3/2005 | Chaskar et al. | |
| 2005/0128967 A1 | 6/2005 | Scobbie | |
| 2005/0171944 A1 | 8/2005 | Palmquist | |
| 2005/0191963 A1 | 9/2005 | Hymes | |
| 2005/0198304 A1 | 9/2005 | Oliver et al. | |
| 2005/0267749 A1 | 12/2005 | Yamada et al. | |
| 2006/0135181 A1 | 6/2006 | Dale et al. | |
| 2006/0167992 A1* | 7/2006 | Cheung et al. ................ | 709/204 |
| 2006/0212621 A1 | 9/2006 | Ash et al. | |
| 2007/0027673 A1 | 2/2007 | Moberg | |
| 2007/0032244 A1* | 2/2007 | Counts et al. .............. | 455/456.1 |
| 2007/0076877 A1 | 4/2007 | Camp et al. | |
| 2007/0130170 A1 | 6/2007 | Forney | |
| 2007/0179389 A1* | 8/2007 | Wariar ......................... | 600/508 |
| 2007/0208813 A1 | 9/2007 | Blagsvedt et al. | |
| 2008/0005068 A1 | 1/2008 | Dumais et al. | |
| 2008/0025482 A1 | 1/2008 | Susama et al. | |
| 2008/0043718 A1 | 2/2008 | Chu | |
| 2008/0059152 A1 | 3/2008 | Fridman et al. | |
| 2008/0076409 A1 | 3/2008 | Hinrikus et al. | |
| 2008/0133228 A1 | 6/2008 | Rao | |
| 2008/0133336 A1 | 6/2008 | Altman et al. | |
| 2008/0171555 A1* | 7/2008 | Oh et al. ..................... | 455/456.1 |
| 2008/0243619 A1 | 10/2008 | Sharman et al. | |
| 2008/0311934 A1 | 12/2008 | Soderstrom | |
| 2009/0030774 A1* | 1/2009 | Rothschild et al. ............. | 705/10 |
| 2009/0055739 A1 | 2/2009 | Murillo et al. | |
| 2009/0082042 A1 | 3/2009 | Harendra et al. | |
| 2009/0124272 A1 | 5/2009 | White et al. | |
| 2009/0129372 A1 | 5/2009 | Pandey et al. | |
| 2009/0147778 A1 | 6/2009 | Wanless et al. | |
| 2009/0163183 A1 | 6/2009 | O'Donoghue et al. | |
| 2009/0175499 A1 | 7/2009 | Rosenblatt | |
| 2009/0254529 A1 | 10/2009 | Goldentouch | |
| 2009/0282030 A1 | 11/2009 | Abbot et al. | |
| 2010/0048242 A1* | 2/2010 | Rhoads et al. ............. | 455/556.1 |
| 2010/0048290 A1 | 2/2010 | Baseley et al. | |

OTHER PUBLICATIONS

"About ContractBuddy"; http//www,contractbuddy.com/aboutCB/features.htm.

"Electronic negotiations, media, and transactions in socioeconomic interactions"; YUAN; http//intemeg.org!enegotiation|resources|online_info,html.

"Distributed PeCo-Mediator: Finding Partners via Personal Connections" OGATA etal.

"What Can Computer Programs Do to Facilitate Negotiation Processes?"; Chaudhury. et al.; 1991 ACM 0-89791-456-2/91/0010/0269.

"Speech Centric Multimodal Interfaces for Mobile Communication Systems"; Kvale et al.; Telektronikk 2.2003; p. 104-117.

"DUMAS—Adaptation and Robust Information Processing for Mobile Speech Interfaces"; Jokinen et al.

"Google SMS: How to Use"; http://www.google.com/smslhowtouse.html.

Author(s) unknown, Voice SMS—Client & Clientiess Solutions Fun Talk SMS, V2V SMS, VoiceSMSData Sheet 1,publication date unknown (copyright 2008), published by Movius.

Yasuto Nakanishi et al "Context Aware Messaging Service:A Dynamic Messaging Delivery Using Location Information and Schedule Information," Personal Technologies (2000)Abstract.

* cited by examiner

| TEXT MESSAGE COMPONENT 500 | CONTEXT DATA 502 | | | | | |
|---|---|---|---|---|---|---|
| | GPS DATA 504 | WIFI LOCATION DATA 506 | RFID LOCATION DATA 508 | SOCIAL NETWORKING PAGE HYPERLINK 510 | BLOG WEBPAGE HYPERLINK 512 | SENDER'S BIOGRAPHICAL INFORMATION 514 |
| HERE | 1 | 1 | 0 | 0 | 0 | 0 |
| ME | 0 | 0 | 0 | 1 | 1 | 1 |
| I | 0 | 0 | 0 | 0 | 0 | 1 |
| HERE ABOUTS | 1 | 0 | 1 | 0 | 0 | 0 |

FIGURE 5

CONTEXT-ENRICHED MICROBLOG POSTING

CLAIM OF PRIORITY

This application is a continuation-in-part of and claims priority to patent application Ser. No. 12/422,313 filed on Apr. 13, 2009 which claims priority from provisional application 61/161,763 filed on Mar. 19, 2009. patent application Ser. No. 12/422,313 is a continuation-in-part of patent application Ser. No. 11/519,600 filed Sep. 11, 2006, issued as U.S. Pat. No. 7,551,935. patent application Ser. No. 11/519,600 is a continuation-in-part of patent application Ser. No. 11/231,575 filed Sep. 21, 2005, issued as U.S. Pat. No. 7,580,719.

FIELD OF TECHNOLOGY

This disclosure relates generally to a communication system, and, more particularly, to a system, a method and an article of manufacture of context-enriched microblog posting.

BACKGROUND

A social networking website may include a number of features that allow users to interact. For example, a user can post a message to either the user's social networking webpage and/or another user's social networking webpage. Example interaction features may include microblogging applications such as status updates, tweets, wall posts and other types of message posts. Microblog posts can include such formats as plain text, hypertext, digital video and/or digital audio.

Microblog posts can be generated with a mobile device. The post itself can refer to a context of the user and/or the mobile device. A user's context can also increase the interest of other users in the microblog post by providing more information. Moreover, other users may be interested in certain categories of contexts. Furthermore, because the mobile device changes location, in some cases, the context can be dynamic. Thus, associating context data with message postings can augment the user experience of a social networking website.

SUMMARY

A system, method, and article of manufacture of context-enriched microblog posting are disclosed. In one aspect, a message component is provided. A context data related to a context of a computing device used to generate the message component is provided. The message component and the context data are associated in a microblog post. The context data may be communicated to a web browser. The message component may be communicated to the web browser. The message component may be rendered in a format for communication as a short message service (SMS) message that includes a reference to the context data. The message component and the context data may be rendered in a format for communication as a multimedia messaging service (MMS) message.

In another aspect, a short message is provided. A location data of a sending device of the short message is provided. The short message is associated with the location data. The short message and the location data are rendered into a format accessible by a web browser. The short message may be posted as a microblog post.

In yet another aspect, SMS text is decoded and parsed. A meaning of a SMS text term is determined. A context data of a sending device related to the meaning SMS text term is determined. The SMS text is annotated with a markup language. The context data is annotated with the markup language. The context data and the SMS text are linked together in a web page document.

BRIEF DESCRIPTION OF THE DRAWINGS

The embodiments of this invention are illustrated by way of example and not limitation in the figures of the accompanying drawings, in which like references indicate similar elements and in which:

FIG. 5 shows a database table correlating a text message component with a type of context data, according to one embodiment.

Other features of the present embodiments will be apparent from the accompanying drawings and from the detailed description that follows.

DETAILED DESCRIPTION

Disclosed are a system, method, and article of manufacture of context-enriched microblog posting. Although the present embodiments have been described with reference to specific example embodiments, it will be evident that various modifications and changes can be made to these embodiments without departing from the broader spirit and scope of the various claims.

Figure 1:
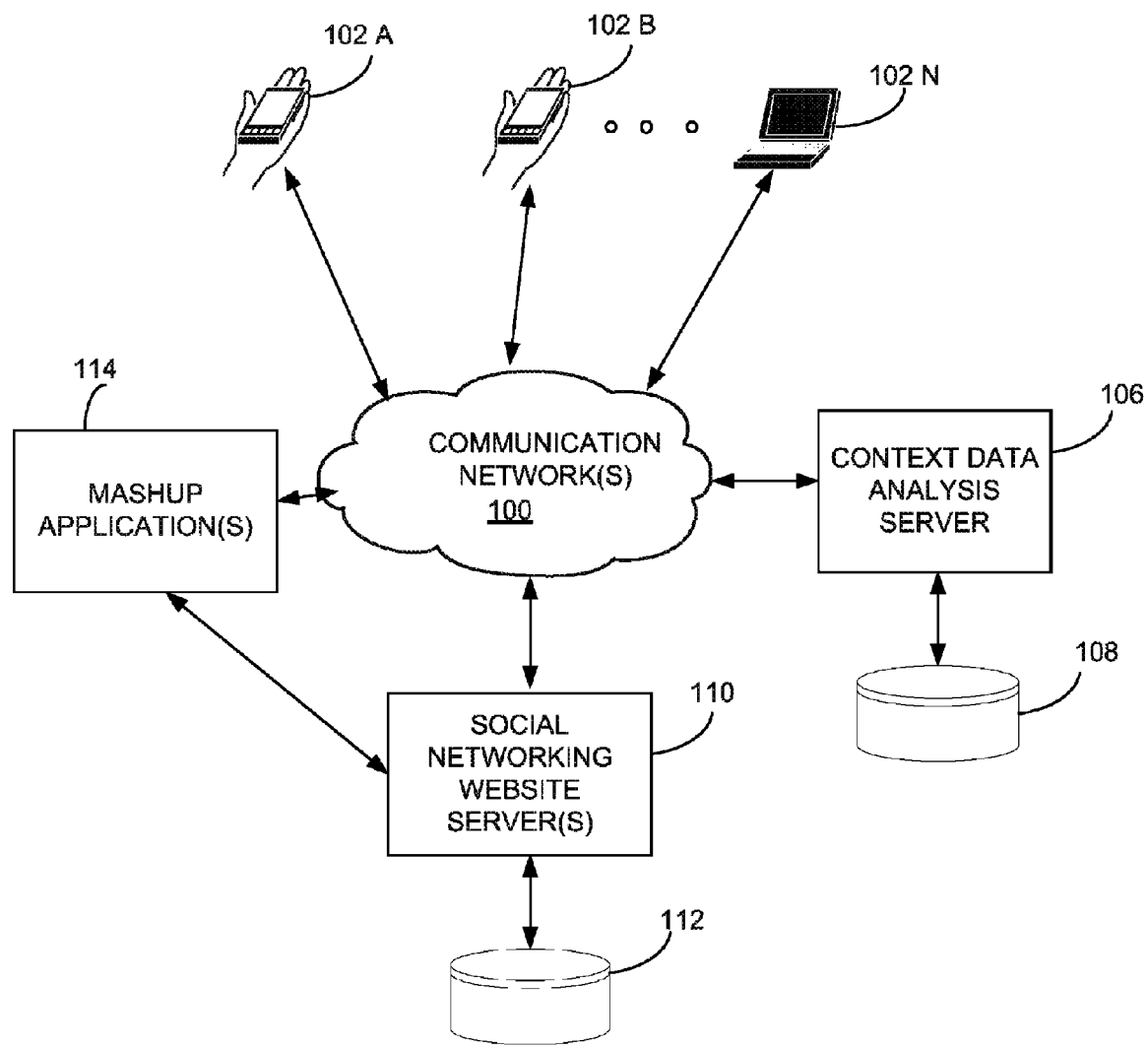
FIG. 1 is a block diagram showing a schematic view of an exemplary system for context-enriched microblog posting that can implement one or more embodiments.

FIG. 1 is a block diagram showing a schematic view of an example system for context-enriched microblog posting that can implement one or more embodiments. Communication network(s) 100 can include any suitable circuitry, device, system or combination of these (e.g., a wireless communications infrastructure including communications towers and telecommunications servers, an IP network, the Internet, and the like) operative to create a computer network. For example, communication network(s) 100 can provide wireless communications using any suitable short-range or long-range communications protocol. In some embodiments, communication network(s) 100 can support, for example, Wi-Fi (e.g., an 802.11 protocol), Bluetooth™, high frequency systems (e.g., 900 MHz, 2.4 30 GHz, and 5.6 GHz communication systems), infrared, other relatively localized wireless communication protocols, or any combination thereof.

In some embodiments, communication network(s) 100 can support protocols used by wireless and cellular phones and personal email devices. Such protocols can include, for example, GSM, GSM plus EDGE, CDMA, UMTS, quad-band, and other cellular protocols. In another example, a long-range communications protocol can include Wi-Fi and protocols for placing or receiving calls using VOIP or LAN. Furthermore, in some embodiments, communication network(s) 100 can include an internet protocol (IP) based network such as the Internet. In this way, the systems and devices of FIG. 1 can transfer data between each other as well as with other computing devices (e.g. third party servers and databases) not shown for the purposes of clarity.

Communication network(s) 100 operatively couples the various computer systems of FIG. 1, such as the mobile devices 102A-N, the context data server 106, the social networking server 110 and any other servers that support the mashup applications 114. In some embodiments, mobile devices 102A-N can include mobile computing devices (e.g. a smart phone such as the iPhone™, Motorola Droid™, Blackberry™, or Nexus One™) such as the one described in conjunction with FIG. 6 infra. As provided infra, mobile devices 102A-N can include smart phone capabilities such as a web browser to access and post messages (e.g. microblog posts, status updates, in-application text messages, SMS messages, MMS messages, EMS messages, etc and/or media content messages such as voice, digital images) on a social networking website hosted by the social networking server 110. For example, mobile devices 102A-N can support a client application that interacts with a server application supported by the social networking server 110 and/or the context data server 106 in order to transmit and receive files that include messages.

In some embodiments, mobile devices 102A-N can also include an application for transmitting and receiving files that include context data and/or context metadata to the social networking server 110 and/or the context data server 106. Mobile devices 102A-N include context data acquisition and analysis capabilities. In some embodiments, mobile devices 102A-N can then communicate the context data to the context data server 106.

It should be noted that in some example embodiments, another type of computing device (e.g. a personal computer, a tablet computer such as the iPad™, a portable media player, personal digital assistant, and/or Wi-Fi mobile platform) can be configured to perform the same functionalities of the mobile devices 102A-N as described supra. Consequently, FIG. 1 should not be interpreted as being exclusive only to mobile devices with regards to other example embodiments.

Social networking server 110 can provide at least one social networking website. In some embodiments, the social networking website can include at least one webpage where message components of microblog posts can be linked with context data. For example, a microblog post can include a text with an associated context data such as the location of the mobile device 102A-N when the microblog post was communicated to the social networking server 110. It should be noted that in some embodiments, the functionalities of servers 106 and 110 can be integrated into a single server or set of servers managed by a single entity. Moreover, in some embodiments, certain functionalities of servers 106 and 110 can be implemented in a cloud computing environment.

Mashup application(s) 114 can reside on servers 106, 110 and/or third-party servers operatively coupled with the communication network(s) 100. Mashup application(s) 114 can include a web application that combines data and/or functionality from more than one source. An example mashup application includes a mapping website (e.g. Google maps™) that includes representations of geolocation metadata of the sending mobile device. Other mashup applications can be utilized that are relevant to specific types of context data provided and the particular meaning of associated message audio content, image content, terms and/or phrases posted to the social networking website.

Figure 2:
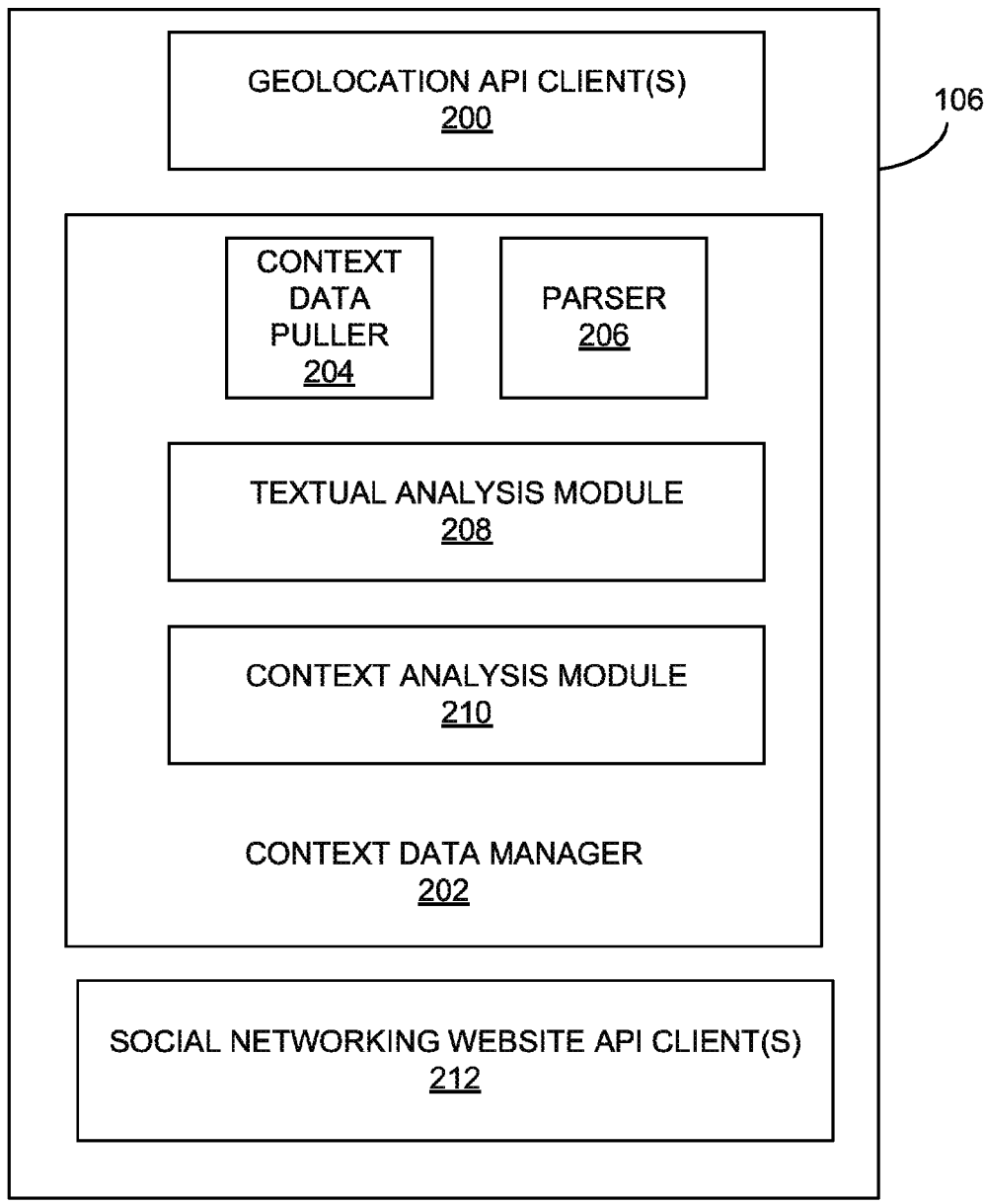
FIG. 2 is a block diagram that illustrates an exemplary context-data analysis server, according to one or more embodiments.

FIG. 2 is a block diagram that illustrates an exemplary context-data analysis server 106 according to one or more embodiments. As shown, the context-data analysis server 106 can analyze a component of a microblog posts well as context data (e.g. geolocation data) from a mobile device. The context-data analysis server 106 can utilize the results of the analysis to associate the component with a relevant context data. The context-data analysis server 106 can then communicate the association data, the context data and the microblog post (and in some embodiments, context metadata, historical data and/or cultural data) to the social networking website server 110.

More specifically, in some embodiments, the context-data analysis server 106 can include a context data manager 202. The context data manager 202 can include a context-data puller 204, a parser 206, textual analysis module 208 and a context analysis module 210. Context-data puller 204 can acquire context data. For example, in some embodiments, context-data puller 204 can query a mobile device and/or third-party system for context data relevant to a user and/or a sending device. Context-data puller 204 can store the context data in a database (such as database 108). Context data puller 204 can interact with a third-party system via an applied program interface (API), such as the geolocation API client 200, to acquire the context data.

For example, context data puller 204 can acquire geolocation data. Geolocation can be performed by associating a geographic location with the Internet Protocol (IP) address, MAC address, RFID, hardware embedded article/production number, embedded software number (such as UUID, Exif/IPTC/XMP or modern steganography), invoice, Wi-Fi connection location, or device GPS coordinates, or even user-disclosed information. Context data puller 204 can perform geolocation operations automatically on a periodic basis (e.g. maintain a substantially current geolocation of a particular user via multiple geolocation data vectors) and/or on a per-message basis. For example, context data puller 204 can utilize the geolocation API client 200 to look up an IP address on a WHOIS service and retrieve a registrant's physical address. In another example, context data puller 204 can query the source of the message for GPS data. It should be noted that in some embodiments, the context analysis module 210 can also determine the geolocation of a message source by such methods as analyzing the context data of a message.

Parser 206 can parse a microblog post (e.g. perform a set of syntactic analysis operations). Textual analysis module 208 can then analyze the message to determine the meaning of the message components. In some embodiments, certain words and/or phrases may have been assigned a predetermined meaning. Textual analysis module 208 can then look up the words and/or phrases in a table. In some embodiments, the meaning of the words and/or phrases may include a cultural dependency variable. For example, textual analysis module 208 can also access databases that include cultural and/or user historical information to determine additional words definitions that depend on the cultural and/or historical usage of the word or phrase. In some embodiments, a user can preset the meaning of a word and/or phrase with an application of the mobile device 102A-N. In some embodiments, the context data manager 202 can also include a digital audio analyzer (e.g. includes a voice to text utility) and/or a digital image analyzer (not shown).

In some embodiments, textual analysis module 208 can utilize one or more pattern recognition algorithms to determine the meaning of a word and/or phrase. Suitable types of pattern recognition algorithms can include neural networks, support vector machines, decision trees, K-nearest neighbor, Bayesian networks, Monte Carlo methods, bootstrapping methods, boosting methods, or any combination thereof.

Context analysis module 210 can analyze context data acquired by the context data puller 204 to associate a relevant context data with a microblog post component according to the meaning of the microblog post component. For example, if the microblog post includes a text message that states "COME PARTY HERE WITH US". The textual analysis module 208 can determine that the message component "HERE" meant the geolocation of the sending device. Context data puller 204 can query the sending device for its GPS data with a time stamp that matches the time stamp of the text message. Context analysis module 210 can then provide metadata instructions for a website server to associate the microblog post component with the GPS data. In some embodiments, context analysis module 210 can determine the geolocation data of the sending device from the context metadata of the microblog post. In some embodiments, the textual analysis module 208 can determine the meaning of the microblog post component "WITH US" means the set of social networking friends present at the same location. Context data puller 204 can, for example, then query the mobile devices of the sender's social networking friends to determine the location of each at the time indicated by the time stamp included in the microblog post. Additionally and/or alternatively, context analysis module 210 can determine the identity of the users of any mobile devices included in the context metadata of the microblog post by the sending mobile device. User identity and/or other mobile device data can be stored in database 108. In some embodiments, context analysis module 210 can then generate an instruction for a website server to link the user's identities with the message component "WITH US" on a webpage. In some embodiments, context analysis module 210 can provide the information to the website server without the instruction.

In some embodiments, the context analysis module 210 can be set to associate a particular type of context data (e.g. geolocation data of a sending device) with a microblog post regardless of the meaning of a microblog post component. In some embodiments, the context analysis module 210 can also perform such operations as determine the quality of the context data (e.g. geolocation accuracy), quality of service of context data sources, and the like.

The context data manager 202 can interact with a social networking website via the social networking website API client 212. For example, the context data manager 202 can provide information, instructions and queries to the social networking website server 110 of FIG. 1 via social networking website API client 212. The context data manager 202 can also receive information (such as microblog posts), instructions and queries from the social networking website server 110 via the social networking website API client 212 as well. For example, in some embodiments, the social networking website server 110 can provide a text message to the context data manager 202. Context data manager 202 can then analyze the microblog post to determine a context data type to associate with a particular microblog post component. Context data manager 202 can then acquire the context data and provide the context data to the social networking website server 110 via the social networking website API client 212.

Figure 3:
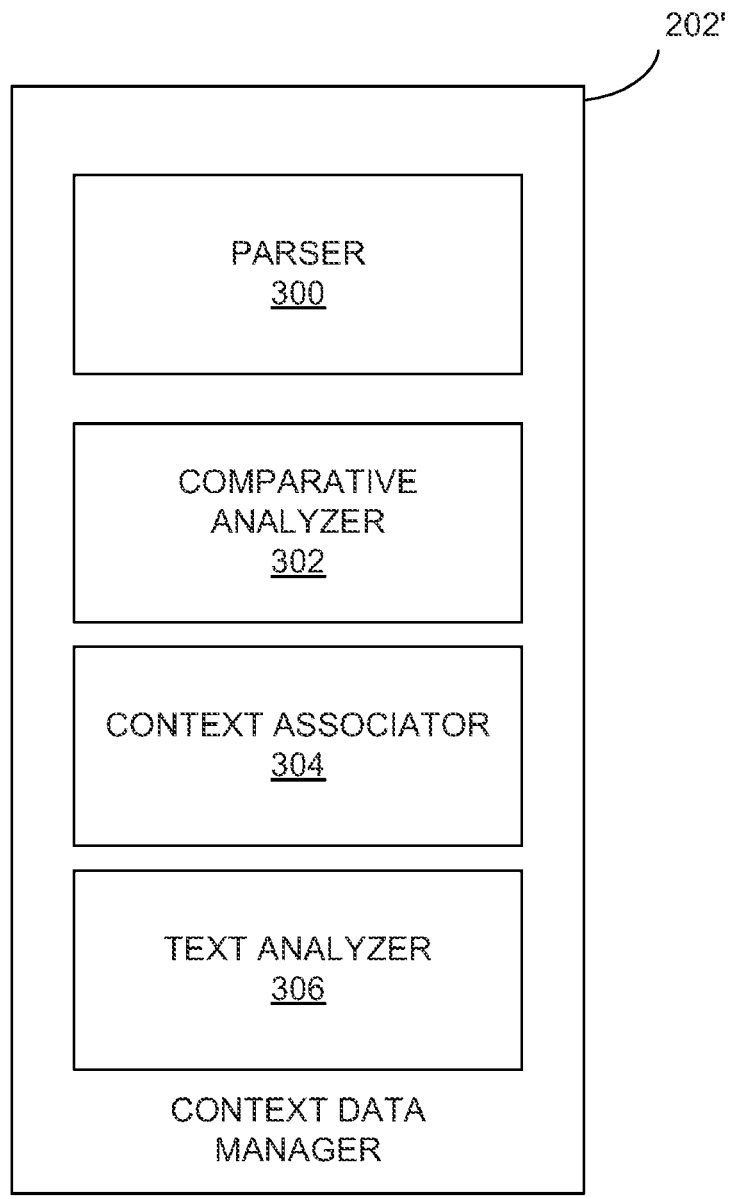
FIG. 3 is a block diagram that illustrates an alternative context data manager, according to some embodiments.

FIG. 3 is a block diagram that illustrates an alternative context data manager 202', according to some embodiments. Context data manager 202' can incorporate the functionalities of the system described in U.S. Pat. No. 7,580,719 (incorporated herein by reference) into the environment of FIG. 1. Moreover, in some embodiments, context data manager 202' can be utilized to perform the operations shown in FIGS. 9-11B.

In particular, in a specific example embodiment, context data manager 202' can analyze context information (such as context data) and short messages (e.g. SMS messages). Context data manager 202' can also store (e.g. in data 108), compare, augment, translate, and forward the context information and short messages. In the specific example embodiment, Parser 300 can consult with both linguistic and cultural databases to generate the intended meaning for the text of a short message. Comparative analyzer 302 can analyze previously-established and stored links and patterns from prior like short messages and then associate further specific context information without requiring input from the sender. Comparative analyzer 302 can forward the base short message text to the recipient along with a means (e.g. a hyperlink) for the recipient to also pull up, on request, the associated information (contextual and comparative) in order to allow the recipient to comprehend the intended meaning of the sender's original text. Context associator 304 can associate and makes explicit at the user-level the contextual information associated with the short message. In the specific example embodiment, context associator 304 can also match and incorporate into a short message previous short messages of a sender and/or recipient of the short message. Text analyzer 306 can determine personal and/or cultural obligations from the short message text.

Figure 4:
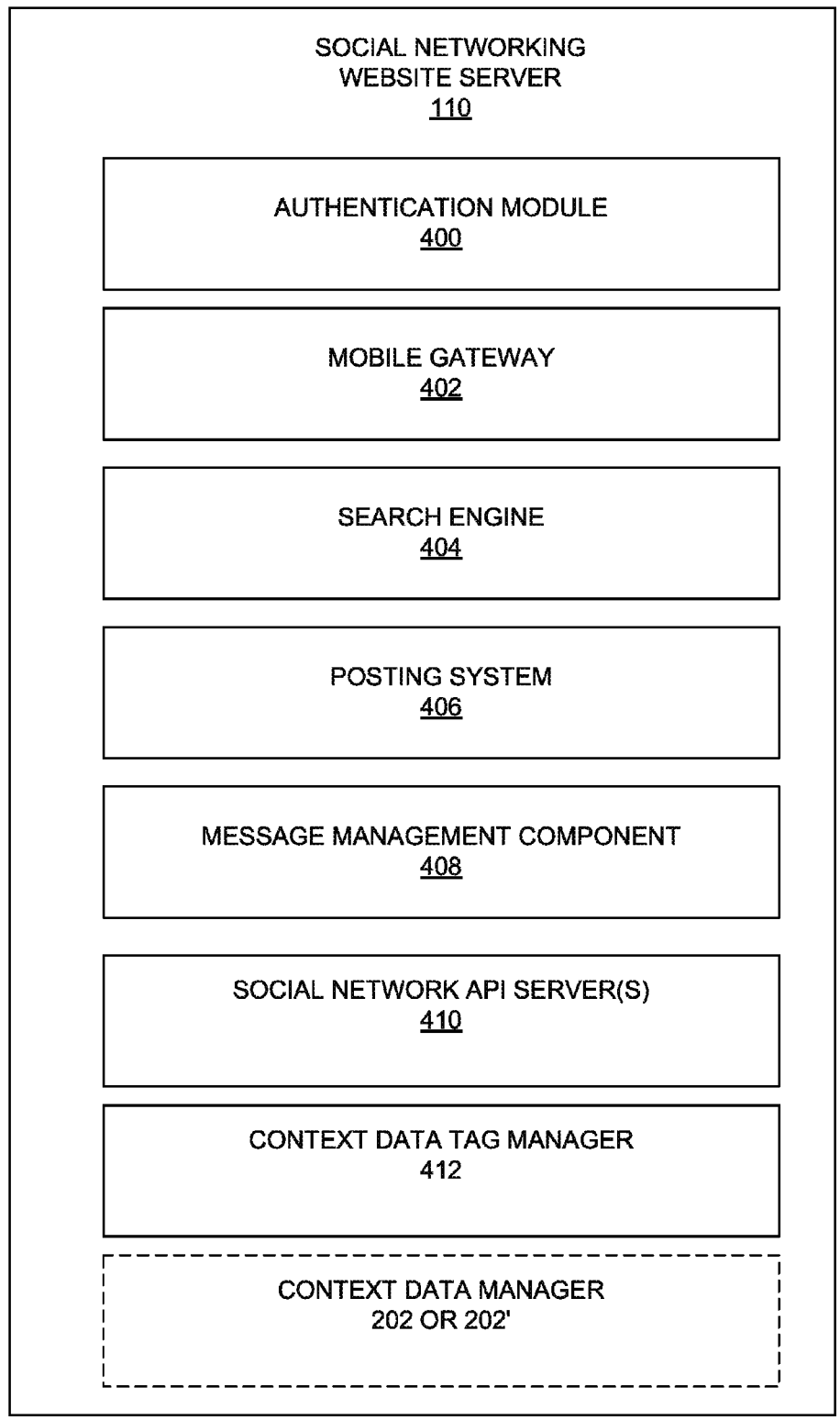
FIG. 4 is a block diagram that illustrates an exemplary social networking website server, according to one or more embodiments.

FIG. 4 is a block diagram that illustrates an exemplary social networking website server 110, according to one or more embodiments. Social networking website server 110 can host a collection of related web pages, images, videos or other digital assets. Social networking website server 110 can also host various API servers. In some embodiments, a web page can be associate with a user (e.g. a home page). The user can utilize a web browser to post messages (such a microblog posts), such as status updates, microblog posts (e.g. a 'tweet') to the web page. In some embodiments, social networking website server 110 can provide a messaging application that the user can utilize to post the message. In some embodiments, the user can post the message to the web site with a text messaging service (such as SMS, MMS, EMS, IMS, IRC). In some embodiments, social networking website server 110 can publish the message via a text messaging service as well. Social networking website server 110 can utilize the context data manager 202 and/or 202' to associate context data related to a sending device with the message (e.g. with a hyperlink to a mashup webpage). In some embodiments, the context data can be related to a receiving device.

In a specific example, social networking website server 110 can include an authentication module 400. Authentication module 400 manages user confirmation operations such as user login. Authentication module 400 can also control access to the resources of the social networking website by placing restrictions on the established identities. Mobile gateway 402 can include standards (e.g. REST and WebService) that allows smart phone messaging applications to access the web pages hosted by the social networking website server 110. Moreover, in some embodiments, social networking website server 110 can utilize the mobile gateway 402 to communicate microblog posts to a mobile device in the form of a message such as an SMS message, and the like. Search engine 404 includes functionalities that allow for the search of information including, inter alia, user identities, user account information, metadata tag, context-data metadata tags, microblog posts and/or context data. Such information can be stored in database 112. Example search engine methods can include web crawling, indexing and web search query. Posting system 406 can manage integrating the messages of microblog posts (such as 'posting' operations) onto a webpage hosted by the social networking website server 110. Message management component 408 can manage parameters for microblog posting such as maximum message length, message media types and/or inclusion of hyperlinks and/or hypertext to context data information. Social network API server(s) 410 enable interaction between the modules and other functionalities of the social networking website server 110 and other applications such mashup applications 116 and those of the context data server 106.

In some embodiments, the social networking website server 110 can also include a context data manager 202 or 202'. Thus, in some embodiments, the social networking website server 110 can perform the functionalities of the context data server 106. For example, the social networking website server 110 can interact and acquire message and context data from the mobile devices 102A-N.

Context-data metadata tags can also be generated by context-data tag manager 412. In some embodiments, a context-data metadata tag can represent at least one context data associated with the microblog post provided by the context data manager 202 or 202'. In some embodiments, a context-data metadata tag can include the number sign (hash tag) '#' as a prefix and a textual description of particular type of context data (e.g. # Giants stadium, # with Mike G., # SFO, # Stan's party, # decreasing barometric pressure, # during take off!, etc.). Textual descriptions can be descriptive of the context data (e.g. # freezing cold!). The textual description can be preset by a user and/or social networking system administrator according to specified parameters. In some embodiments, a description can be limited to context data, sometimes with a standardized unit (e.g. #35.16533-106.60946, #300 mph, #30,000 ft.). Social networking website server 110 can utilize context-data tag manager 412 to link context-data metadata tags to a microblog post. Social networking website server 110 can then place the message into a category according to its context-data metadata tags. For example, a microblog post can display that it has been tagged with # moving over 45 mph and/or #85 degrees. A context metadata tag can include a web link leading to an index page listing other microblog posts associated with the context metadata tag. The microblog webpage can include a sidebar listing all the tags in use on that the microblog, with each tag leading to an index page: In some embodiments, connections between microblog posts can be automatically tracked and updated by the context-data tag manager 412. In some embodiments, the context-data tag manager 412 can also render a visual depiction of context-data metadata tags such as a context-data metadata tag cloud.

In one embodiment, context-data tag manager 412 can periodically update a context-data metadata tag. For example, context-data tag manager 412 can periodically instruct the context data manager 202 to query a context data source (such as a mobile device) and provide updated context data. Context-data tag manager 412 can then generate a new context-data metadata tag that is associated with a microblog post. Context-data metadata tag manager 412 can also store older context-data metadata tags in database 112.

In some example embodiments, the social networking website server 110 can include a persistent queue server that uses a memcached protocol (e.g. Starling, Kestrel) to post microblog posts. The social networking website server 110 can also present a web interface using a Ruby on Rails framework.

FIG. 5 shows a database table correlating a text message component with a type of context data, according to one embodiment. Column l includes fields for text message components 500. Columns two to seven 504-514 include fields for correlating the text message component 500 with a context data 502 such as the particular context data 504-514 types shown. In one example embodiment, the context data manager 202 (and/or in some embodiments 202') may access the database table to determine which types of context data to associate with particular text message components 500.

Figure 6:
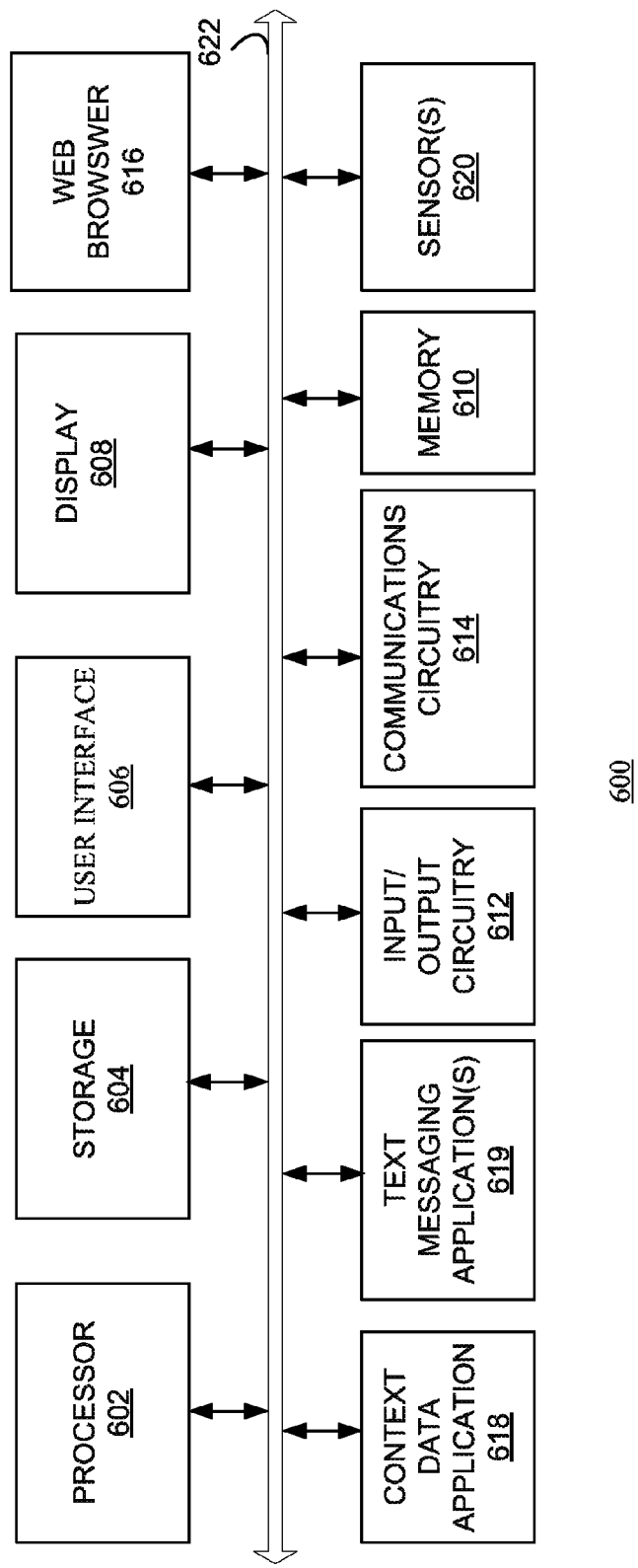
FIG. 6 shows a simplified block diagram of a portable electronic device, in accordance with one or more embodiments.

FIG. 6 shows a simplified block diagram of a portable electronic device 600 constructed and used in accordance with one or more embodiments. In some embodiments, portable electronic device 600 can be a portable computing device dedicated to processing multi-media data files and presenting that processed data to the user such as the mobile device 102A-N of FIG. 1. For example, portable electronic device 600 can be a dedicated media player (e.g., MP3 player), a game player, a remote controller, a portable communication device, a remote ordering interface, a tablet computer or other suitable personal device. In some embodiments, portable electronic device 600 can be a portable device dedicated to providing multi-media processing and telephone functionality in single integrated unit (e.g. a smart phone).

Portable electronic device 600 can be battery-operated and highly portable so as to allow a user to listen to music, play games or videos, record video or take pictures, place and take telephone calls, communicate with other people or devices, control other devices, and any combination thereof. In addition, portable electronic device can be sized such that it fits relatively easily into a pocket or hand of the user. By being handheld, portable electronic device 600 is relatively small and easily handled and utilized by its user and thus can be taken practically anywhere the user travels.

Portable electronic device 600 can include processor 602, storage 604, user interface 606, display 608, memory 610, input/output circuitry 612, communications circuitry 614, web browser 616, and/or bus 622. In some embodiments, portable electronic device 600 can include more than one of each component or circuitry, shown in FIG. 6, but for the sake of clarity and illustration, only one of each is shown in FIG. 6. In addition, it will be appreciated that the functionality of certain components and circuitry can be combined or omitted and that additional components and circuitry, which are not shown in FIG. 6, can be included in portable electronic device 600.

Processor 602 can include, for example, circuitry for and be configured to perform any function. Processor 602 can be used to run operating system applications, media playback applications, media editing applications, and/or any other application. Processor 602 can drive display 608 and can receive user inputs from user interface 606.

Storage 604 can be, for example, one or more storage mediums, including for example, a hard-drive, flash memory, permanent memory such as ROM, semipermanent memory such as RAM, any other suitable type of storage component, or any combination thereof. Storage 604 can, store, for example, media data (e.g., music and video files), application data (e.g., for implementing functions on mobile devices 102A-N), firmware, preference information data (e.g., media playback preferences), lifestyle information data (e.g., food preferences), exercise information data (e.g., information obtained by exercise monitoring equipment), transaction information data (e.g., information such as credit card information), wireless connection information data (e.g., information that can enable the mobile devices 102A-N to establish a wireless connection), subscription information data (e.g., information that keeps track of podcasts or television shows or other media a user subscribes to), contact information data (e.g., telephone numbers and email addresses), calendar information data, any other suitable data, or any combination thereof.

User interface 606 can allow a user to interact with portable electronic device 600. For example, the device for user interface 606 can take a variety of forms, such as at least one a button, keypad, dial, a click wheel, a touch screen or any combination thereof.

Display 608 can accept and/or generate signals for presenting media information (textual and/or graphic) on a display screen, such as those discussed above. For example, display 608 can include a coder/decoder (CODEC) to convert digital media data into analog signals. Display 608 also can include display driver circuitry and/or circuitry for driving display driver(s). The display signals can be generated by processor 602 or display 608. The display signals can provide media information related to media data received from communications circuitry 614 and/or any other component of portable electronic device 600. In some embodiments, display 608, as with any other component discussed herein, can be integrated with and/or externally coupled to portable electronic device 600.

Memory 610 can include one or more different types of memory that can be used for performing device functions. For example, memory 610 can include cache, Flash, ROM, RAM, or one or more different types of memory used for temporarily storing data. Memory 610 can be specifically dedicated to storing firmware. For example, memory 610 can be provided for storing 30 firmware for device applications (e.g., operating system, user interface functions, and processor functions).

Input/output circuitry 612 can convert (and encode/decode, if necessary) data, analog signals and other signals (e.g., physical contact inputs, physical movements, analog audio signals, etc.) into digital data, and vice-versa. The digital data can be provided to and received from processor 602, storage 604, and memory 610, or any other component of portable electronic device 600. Although input/output circuitry 612 is illustrated in FIG. 6 as a single component of portable electronic device 600, a plurality of input/output circuitry can be included in portable electronic device 600. Input/output circuitry 612 can be used to interface with any input or output component. For example, portable electronic device 600 can include specialized input circuitry associated with input devices such as, for example, one or more microphones, cameras, proximity sensors, accelerometers, ambient light detectors, magnetic card readers, etc. Portable electronic device 600 can also include specialized output circuitry associated with output devices such as, for example, one or more speakers, etc.

Communications circuitry 614 can permit portable electronic device 600 to communicate with one or more servers or other devices using any suitable communications protocol. For example, communications circuitry 614 can support Wi-Fi (e.g., a 802.11 protocol), Ethernet, Bluetooth™ (which is a trademark owned by Bluetooth Sig, Inc.) high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The portable electronic device 600 can include a sensor. Additionally, the portable electronic device 600 includes a client program, such as web browser 616, for retrieving, presenting, and traversing information resources on the World Wide Web.

Context data application 618 can time stamp acquired context data. Additionally, context data application 618 can also encode format context data for communication according to a protocol utilized by the communications network(s) 100. Moreover, context data application 618 can receive context data inquiries from and provide the context data to a remote application (e.g. such as a context data puller 204). Text message application(s) 619 provides applications for the composing, sending and receiving of text messages.

The portable electronic device 600 further includes at least one sensor 620. In one embodiment, the sensor 620 can be a device that measures, detects or senses an attribute of the mobile device's environment and then converts the attribute into a machine-readable form that can be utilized by an application such as the context data manager 202). In some embodiments, a sensor 620 can be a device that measures an attribute of a physical quantity and converts the attribute into a user-readable or computer-processable signal. In certain embodiments, a sensor 620 can also measure an attribute of a data environment, a computer environment and a user environment in addition to a physical environment. For example, in another embodiment, a sensor 620 may also be a virtual device that measures an attribute of a virtual environment such as a gaming environment. Example sensors include, inter alia, global positioning system receivers, accelerometers, inclinometers, position sensors, barometers, WiFi sensors, RFID sensors, near-filed communication (NFC) devices, gyroscopes, pressure sensors, pressure gauges, time pressure gauges, torque sensors, ohmmeters, thermometers, infrared sensors, microphones, image sensors (e.g. digital cameras), biosensors (e.g. photometric biosensors, electrochemical biosensors), capacitance sensors, radio antennas and /or capacitance probes. It should be noted that the other sensor devices other than those listed can also be utilized to 'sense' context data.

Figure 7:
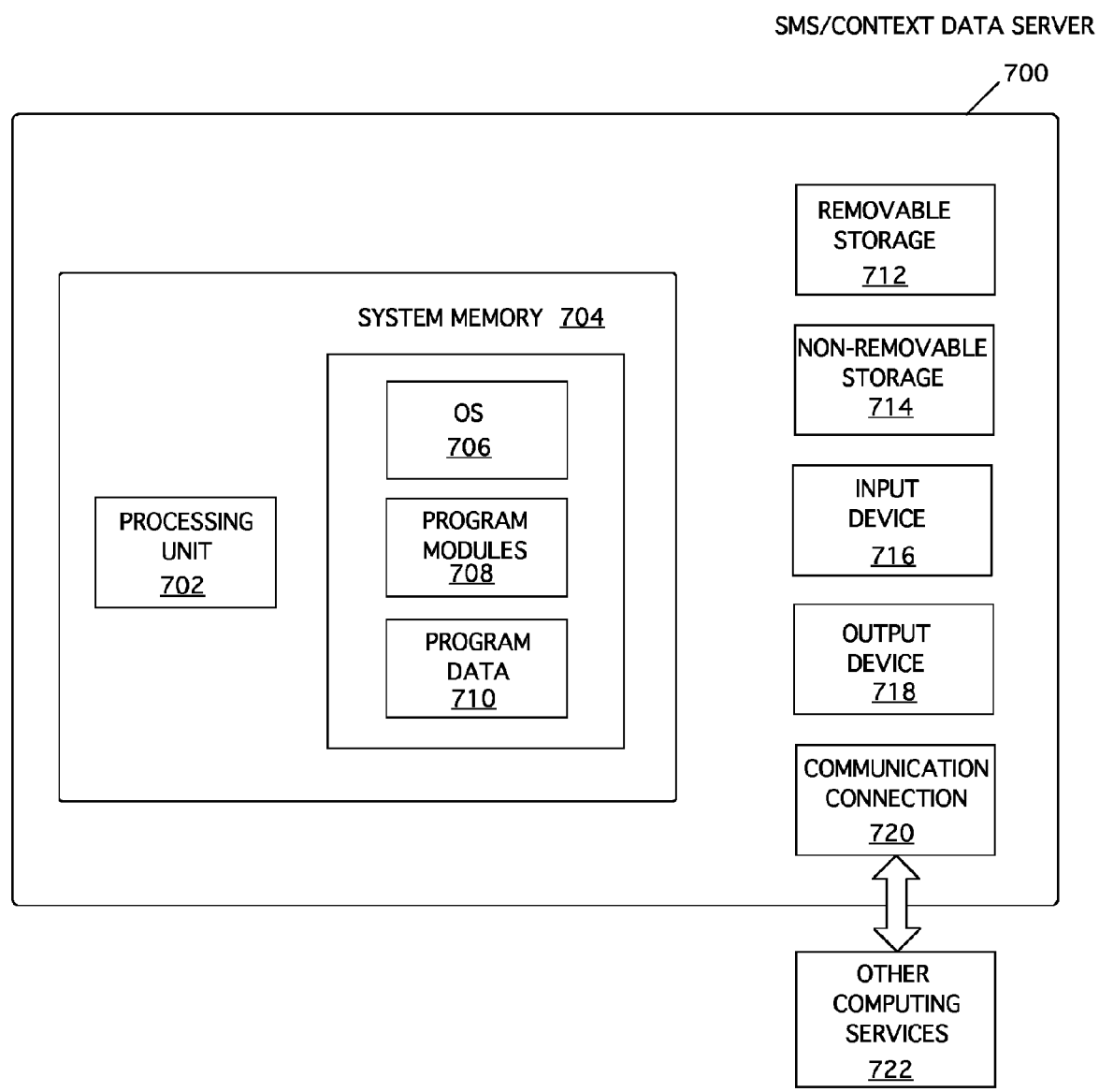
FIG. 7 is a functional block diagram of an exemplary computing device, according to one or more embodiments.

FIG. 7 is a functional block diagram of an exemplary computing device, according to one embodiment. In some embodiments, the computing device can function as server 700 such as context data analysis server 110, social networking website server(s) 110 and/or a third-party server supporting a mashup application 114. In a basic configuration, server 700 typically includes at least one processing unit 702 and system memory 704. Depending on the exact Configuration and type of computing device, system memory 704 may be volatile (such as RAM), non-volatile (such as ROM, flash memory, etc.) or some combination of the two. System memory 704 typically includes an operating system 706, one or more program modules 708, and may include program data 710. In some embodiments, the system memory 704 may also include the context data manager 202 or 202'. Server 700 can also include additional features or functionalities. For example, server 700 can include additional data storage devices (removable and/or non-removable) such as, for example, magnetic disks, optical disks, or tape. Such additional storage is illustrated in FIG. 7 by removable storage 712 and non-removable storage 714. In some embodiments, data stores 108 and 112 can function as additional storage. Computer storage media can include volatile and nonvolatile, removable and non-removable media implemented in any method or technology for storage of information, such as computer readable instructions, data structures, program modules, or other data. The system memory 704, removable storage 712 and non-removable storage 714 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which storage media may be part of server 700. Server 700 can also include input device(s) 716 such as keyboard, mouse, pen, voice input device, touch input device, etc. Output device(s) 718 such as a display, speakers, printer, etc. may also be included. These devices are well known in the art and need not be discussed at length here.

Server 700 can also include communication connections 720 that allow the device to communicate with other computing devices over a network. Communication connections 720 are one example of communication media. Communication media may typically be embodied by computer readable instructions, data structures, program modules, or other data in a modulated data signal, such as a carrier wave or other transport mechanism, and includes any information delivery media. The "modulated data signal" means a signal that has one or more of its characteristics set or changed in such a manner as to encode information in the signal. By way of example, and not limitation, communication media can include wired media such as a wired network or direct-wired connection, and/or wireless media such as acoustic, radio frequency, infrared and other wireless media. The computer readable media as used herein can include both storage media and communication media according to various example embodiments.

Figure 8:
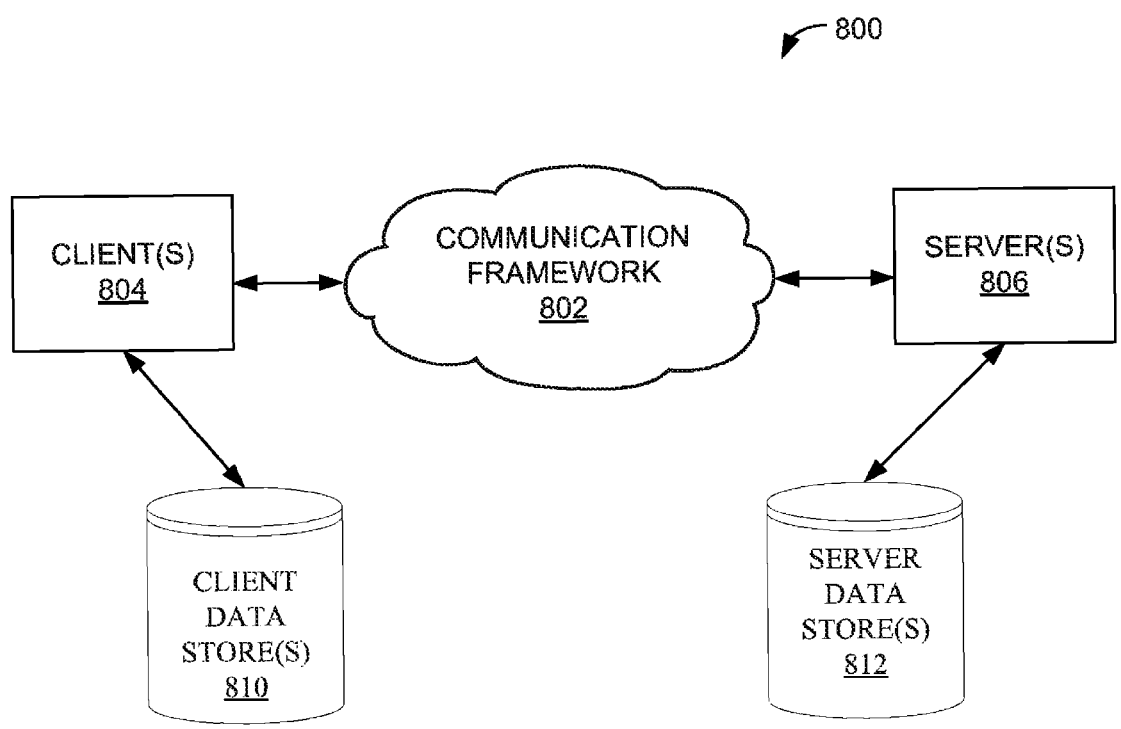
FIG. 8 illustrates a block diagram of an exemplary computing environment in accordance with one or more embodiments.

FIG. 8 illustrates a block diagram of an exemplary computing environment 800 in accordance with the methods and operations described in FIGS. 9-11B, infra. The system 800 includes one or more client(s) 804. The client(s) 804 can be hardware circuitry and/or software applications (e.g., threads, processes, computing devices), that initiates communications with the server(s) 806 according to the client-server communication paradigm. The client(s) 804 can house cookie(s) and/or associated contextual information to perform the methods and operations described in FIGS. 9-11B, infra, for example.

The system 800 also includes one or more server(s) 806. In some embodiments, the server(s) 806 can also be hardware circuitry and/or software applications (e.g., threads, processes, computing devices). The server(s) 806 can house threads to perform the methods and operations described in FIGS. 9-11B, infra, for example. One possible communication between a client 804 and a server 806 can be in the form of a data packet adapted to be transmitted between two or more computer processes. The data packet can include a cookie and/or associated contextual information, for example. The system 800 includes a communication framework 802 (e.g., communications network 100, the Internet, etc) that can be employed to facilitate communications between the client(s) 804 and the server(s) 806.

Communications can be facilitated via a wired (including optical fiber) and/or wireless technology. The client(s) 804 can be operatively connected to one or more client data store(s) 810 that can be employed to store information local to the client(s) 804 (e.g., cookie(s) and/or associated contextual information). Similarly, the server(s) 806 can be operatively connected to one or more server data store(s) 812 that can be employed to store information local to the server(s) 806. It should be noted that, in some embodiments, a particular application can function as a client in one context or operation and as a server in another context or operation.

Regarding FIG. 9-11B, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with some embodiments, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with some embodiments.

Figure 9:
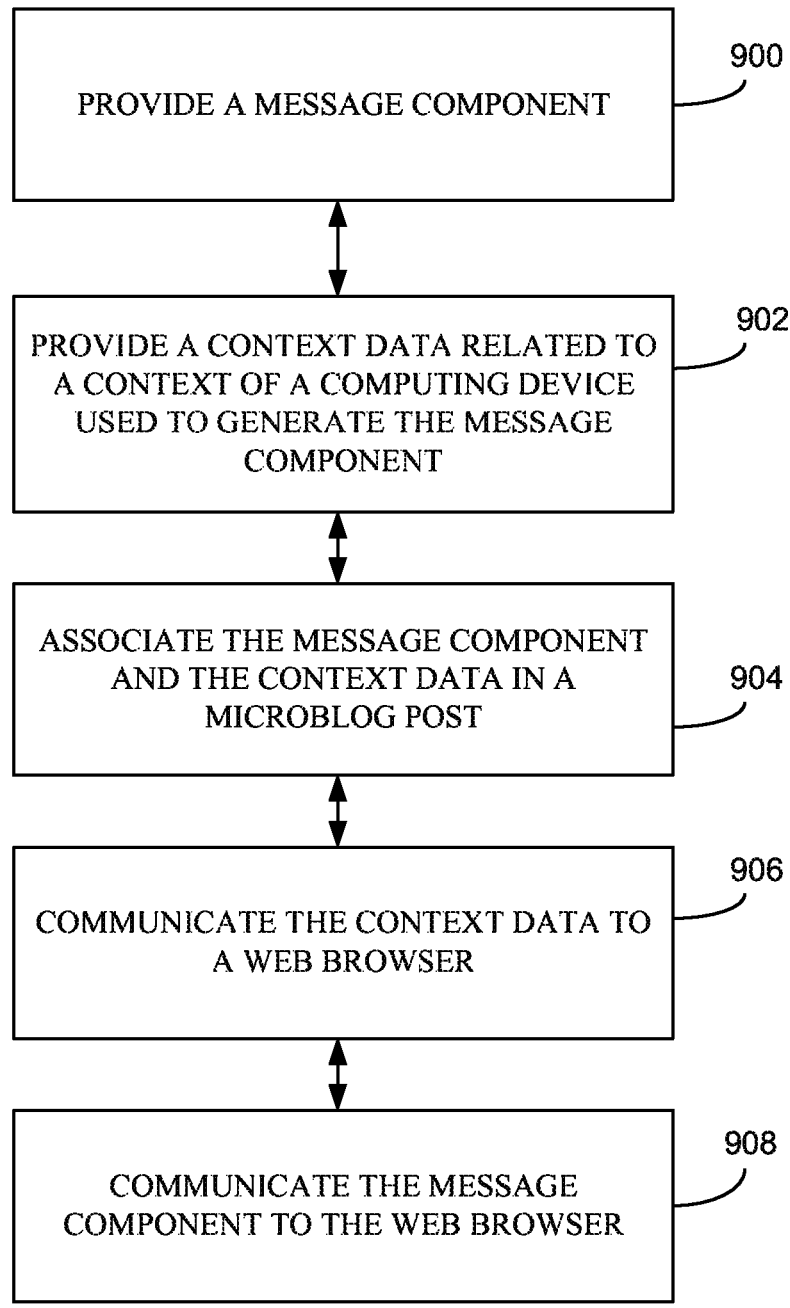
FIG. 9 illustrates a methodology of incorporating a message component and a context data into a webpage as a microblog post, according one embodiment.

FIG. 9 illustrates a methodology of incorporating a message component and a context data into a webpage as a microblog post, according one embodiment. In operation 900, a message component is provided. In some embodiments, a mobile gateway can be utilized to link a server (e.g. 106 and 110) to a cellular network. In some embodiments, the message component can be in the form of an IP packet. The server can received the IP packet via an IP network connection. In some embodiments, the message can be a text message generated by the text message component 619. In operation 902, a context data related to a context of a computing device used to generate the message component is provided. For example, the context data can be acquired by a sensor 620 integrated into the portable electronic device 600. In another example, context data can be derived from other sources such as cellular network server and/or those methods described supra. In operation 904, the message component and the context data are associated in a microblog post. For example, in some embodiments, the context data manager 202 can generate metadata that provide the association. In some embodiments, the association can include a hyperlink embedded in a text message to a mashup application with information about the context data. In operation 906, the context data is communicated to a web browser. In operation 908, the message component is communicated to a web browser. For example, a web browser operating on a mobile device 102A-N can request a microblog webpage. The server (e.g. the social network website server 110) can integrate the message and the context data into a microblog post with a markup language (e.g. html) and provide a web page to the mobile device 102A-N. In another example, the server can integrate a hyperlink to another webpage with information about the context data.

Figure 10:
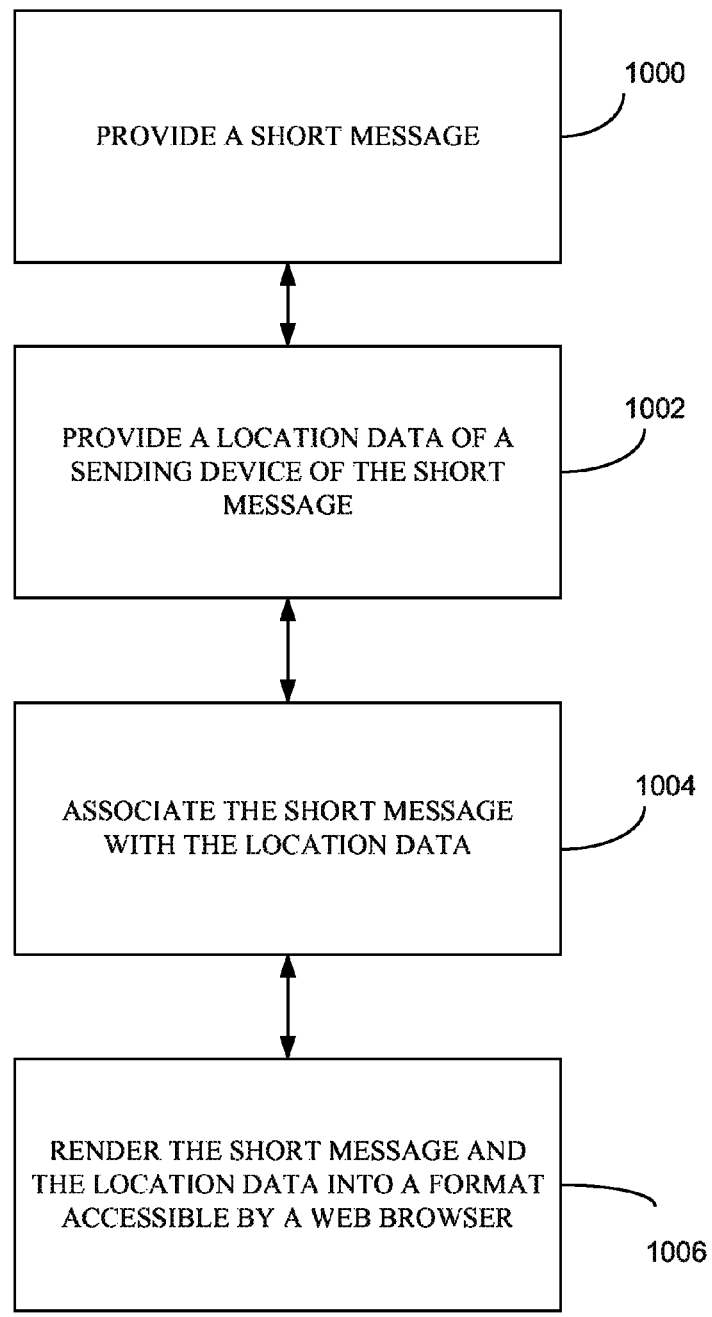
FIG. 10 illustrates a methodology that implements one or more embodiments of context-enriched microblog posting.

FIG. 10 illustrates a methodology that implements one or more embodiments for context-enriched microblog posting. In operation 1000, a short message is provided. In operation 1002, a location data of the sending device of the short message is provided. In operation 1004, the short message is associated with the location data. In operation 1006, a short message and a location data is rendered into a format accessible by a web browser. The elements of FIGS. 1-8 can be utilized to perform operations 1000-1006. For example, a mobile device 102A-N can provide a short message and/or location data. The context data manager 202 or 202' can associate the location data with the short message. The social networking website server 110 can render a web page that includes at least one of the short message and the location data (e.g. as a social networking personal webpage status update) as well as hyperlinks to other web pages with additional information about the short message and/or the location data.

Figure 11A:
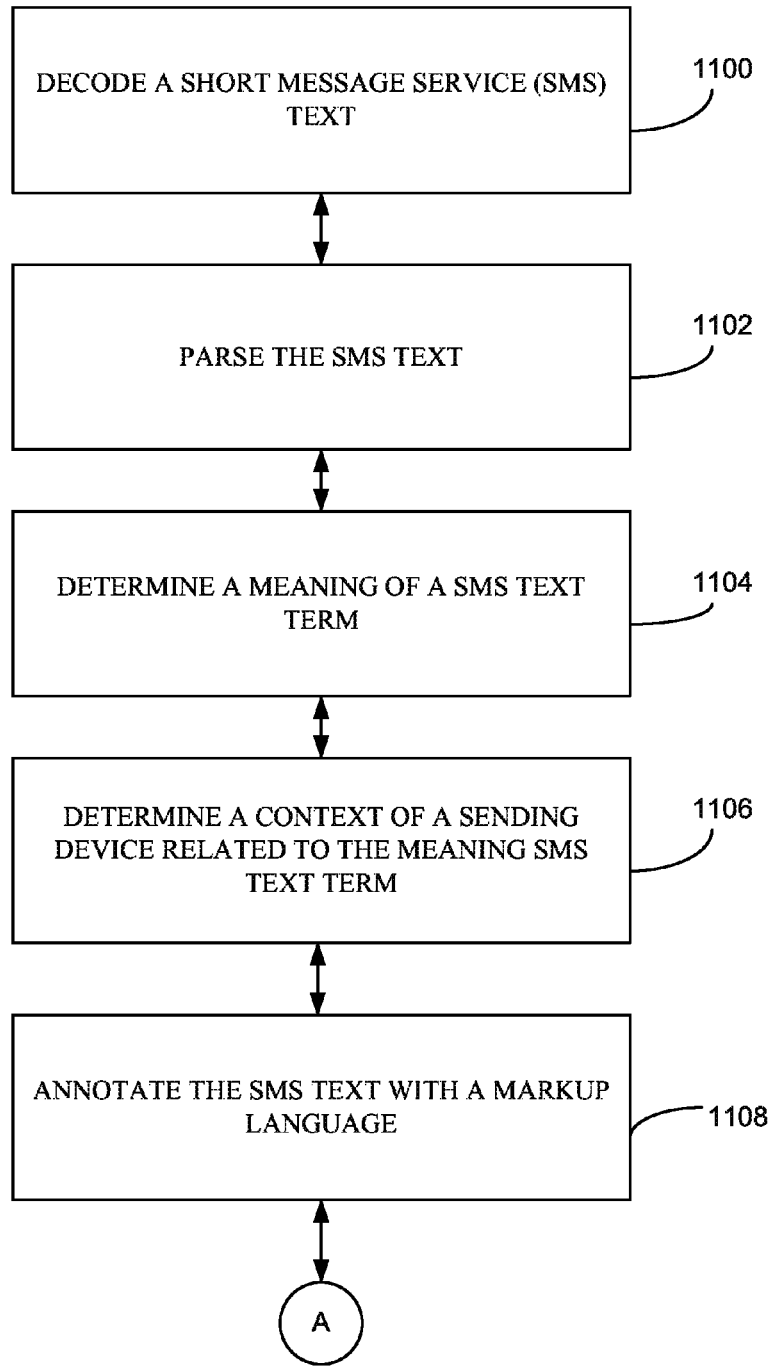
FIGS. 11A-B illustrates another methodology that implements one or more embodiments of context-enriched microblog posting.
Figure 11B:
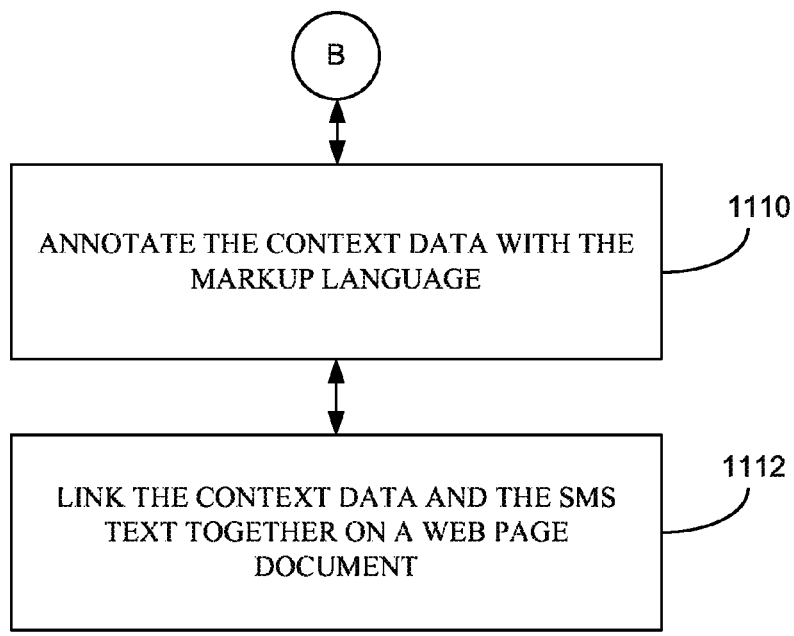

FIGS. 11A-B illustrate another methodology that implements one or more embodiments for context-enriched microblog posting. In operation 1100, an SMS text is decoded. In operation 1102, the SMS text is parsed. In operation 1104, a meaning of an SMS text term is determined. In operation 1106, a context data related to the meaning of the SMS text term is determined. In operation 1108, the SMS text is annotated with a markup language. In operation 1110, the context data is annotated with a markup language. In operation 1112, the SMS text and the context data are linked together on a web page document. The elements of FIGS. 1-8 can be utilized to perform operations 1100-1112, according to various embodiments.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense.

What is claimed is:

1. A method comprising:
obtaining a message component of a microblog post;
determining a meaning of the message component;
acquiring a context data determined according to the meaning of the message component, wherein the context data is obtained by a sensor communicatively coupled with a mobile device used to generate the message component, and wherein the sensor measures an attribute of the mobile device's environment and then converts the attribute into a machine-readable form;
algorithmically generating a context-data metadata tag, wherein the context-data metadata tag comprises an alphanumeric textual description of the context data; and
associating the message component and the context data metadata tag in the microblog post.

2. The method of claim 1 further comprising:
communicating the context data to a web browser; and
communicating the message component to the web browser.

3. The method of claim 2, wherein the context data comprises a geolocation data of the computing device used to generate the message component.

4. The method of claim 2 further comprising:
posting the message component as a user's status update on a social networking website.

5. The method of claim 2 further comprising:
posting the message component in a hypertext format.

6. The method of claim 2, wherein the context data is related to a meaning of the message component.

7. The method of claim 2, wherein the message component comprises a portion of a text message.

8. The method of claim 7, wherein the message component comprises a portion of a SMS message.

9. The method of claim 2, further comprising:
rendering the message component in a format for communication to a web browser with an HTTP protocol.

10. The method of claim 1,
wherein the context-data metadata tag comprises an alphanumeric textual description of a relationship between two or more context data values obtained from the sensor, and wherein the textual description describes a value change between the two or more context data values.

11. The method of claim 1 further comprising:
rendering the message component in a format for communication as a short message service (SMS) message that comprises a reference to the context data.

12. The method of claim 1 further comprising:
rendering the message component and the context data in a format for communication as a multimedia messaging service (MMS) message.

13. A method comprising:
receiving a short message composed with a mobile device;
receiving a context data of a sending device of the short message, wherein the context data comprises a measure of an attribute of an environment of the mobile device, and wherein the attribute is related to a meaning of a term of the short message;
generating a context-data tag from the context data;
tagging the short message with the context-data tag; and
rendering the short message and the context-data tag into a format accessible by a web browser.

14. The method of claim 13 further comprising:
posting the short message as a microblog post.

15. The method of claim 13 further comprising:
rendering the short message and the location data into a format that launches a mashup application if a user-controlled pointer is passed over a component of the short message.

16. The method of claim 13, wherein the location data is derived from a global position (GPS) data.

17. method of claim 13 further comprising:
querying the sending device for a another location data that is current to the sending device's location when the query is received by the sending device.

18. The method of claim 17 further comprising:
rendering the other location data into a format accessible by a web browser.

19. The method of claim 13, wherein the association of the short message with the location data comprises a hyperlink to a webpage comprising additional information regarding the location data.

20. The method of claim 19, wherein the webpage comprising additional information regarding the location data comprises a web mapping service application.

21. A method comprising:
decoding a short message service (SMS) text;
parsing the SMS text;
determining a meaning of a SMS text term;
determining a context data of a sending device related to the meaning of the SMS text term, wherein the context data is determined according to a meaning of the SMS text term, and wherein the context data comprises a measure of an attribute of an environment of a mobile device used to create the SMS text;
rendering the context data into a metadata tag; and
linking the metadata tag of the context data and the SMS text together in a microblog post.

22. The method of claim 21 further comprising:
annotating the SMS text with a markup language; and
annotating the context data with the markup language.

23. A method comprising:
- receiving a short message from a mobile device;
- receiving a context data related to the context of the mobile device, wherein the context data is also related to a meaning of a part of the short message;
- formatting the short message and the context data into a format that can be accessed through a web browser; and,
- explicitly linking the short message and the context data in a microblog post.

24. The method of claim 23, wherein receiving a context data related to the context of the mobile device further comprises:
- receiving a context data derived from a near-field communication signal.

25. The method of claim 23, wherein receiving a context data related to the context of the mobile device further comprises:
- receiving a context data derived from a biosensor in the mobile device.

26. The method of claim 23, wherein receiving a context data related to the context of the mobile device further comprises:
- receiving a context data derived from an accelerometer in the mobile device.

* * * * *